Jan. 23, 1945.    R. W. BROWN    2,367,836
CABLE GUIDE BUSHING
Filed May 14, 1943

Inventor
ROY W. BROWN

By
Attorneys

Patented Jan. 23, 1945

2,367,836

UNITED STATES PATENT OFFICE 2,367,836

CABLE GUIDE BUSHING

Roy W. Brown, Akron, Ohio, assignor to The Firestone Tire & Rubber Company, Akron, Ohio, a corporation of Ohio Application May 14, 1943, Serial No. 487,055

1 Claim. (Cl. 16—2)

This invention relates to a cable guide bushing and it has for one of its objects the providing of such bushing as will insure a satisfactory fit in panels which vary substantially in thickness.

Another object of the invention is to provide a cable guide bushing which is easily installed in an opening in a panel provided for said bushing.

Yet another object of the invention is to provide a guide bushing with a lubricated fabric lined opening through the central part thereof whereby the friction between a cable and the bushing is materially reduced and the life of the bushing and the cable is prolonged.

Still another object of the invention is to provide a cable guide bushing whose surface about its central opening is convex in section.

The foregoing and other objects, features and advantages of the invention are attained by the bushing illustrated by the accompanying drawing and described below.

Figure 1:
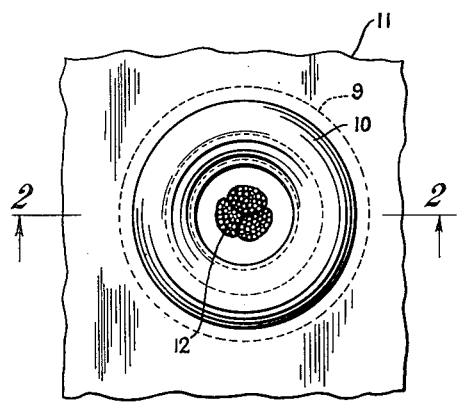
Fig. 1 shows a plan view of a bushing mounted in a panel in operative position with a sectional view of a cable as it would appear when the cable passes centrally through the opening in the bushing.
Figure 3:
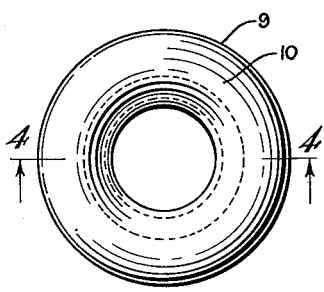
Fig. 3 is a plan view of the bushing shown in Fig. 1.
Figure 2:
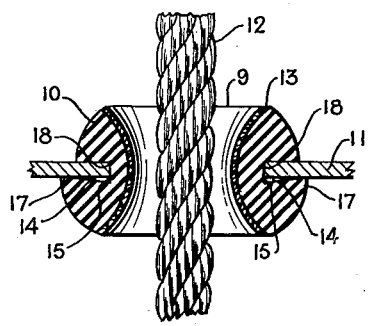
Fig. 2 is a sectional view taken on line 2—2 of Fig. 1, the cable being shown in elevation.
Figure 4:
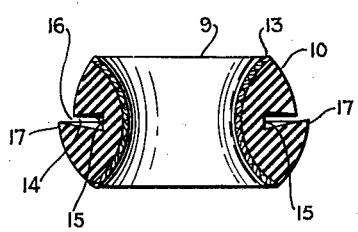
Fig. 4 is a sectional view taken on line 4—4 of Fig. 3.

By reference now to the drawing it will be seen that a bushing 9, embodying the invention, comprises a ring-like body portion 10, said body portion being composed of resilient, oil-resistant compound which also has good tear and permanent set resisting qualities. A compound of this type is, for example, but without limitation, neoprene or Buna N, of 60 durometer hardness. Neoprene is a synthetic elastomer which may be considered to be essentially a polymer of 2-chloro-1, 3-butadiene or a copolymer of 2-chloro-, 3-butadiene and another polymerizable substance. Buna N is a synthetic elastomer which may be considered to be essentially a copolymer of butadiene and acrylonitrile. The bushing 9 has a circumferential groove 14 extending inwardly from its periphery, said groove having substantial depth and being wider at its bottom 15 than at its mouth 16, the body structure on one side of said groove being extended to form a protruding lip 17. The bushing 9 conveniently may be mounted in a hole 19 in a panel 11 as shown in Figs. 1 and 2. The protruding lip 17 will facilitate such mounting by affording a contact surface against which the portions of a panel around said hole may resist the passing of the bushing through said opening thereby prying open the outwardly tapered groove 14 permitting the entrance of the edges 18 of the panel 11, which edges define said hole 19. It will now be seen by reference to Fig. 2 that although the thickness of the panel 11 is less than the width of the groove 14, at its bottom 15, yet the mouth 16 of the groove is forced open to receive said panel and that therefore said panel is gripped by the lips of said groove and the bushing 9 firmly attached thereto. It will also be seen by reference to the same Fig. 2 that due to the rubber-like nature of the material composing the body portion 10 of said bushing and the shape of the groove 14 that the bushing is adapted for attachment to panels of varying thicknesses.

The inside surface of the bushing 9 has attached thereto, by vulcanization, or by any method found satisfactory, a layer of friction material 13. This layer 13 is preferably composed of fabric and it protects the body 10 of the bushing from being exposed directly to a cable 12 passing through the central opening of the bushing. Said layer also provides a surface against which said cable makes a low friction contact. The low friction effect is obtained by impregnating the layer 13 with a proper lubricant. One method of impregnating the layer 13 which has been found satisfactory is to dip the bushing, after it has been molded with said layer in position, into a solution of paraffin and oil, allowing the bushing to remain in the solution long enough for the layer 13 to become thoroughly saturated with the paraffin and oil. While the low friction material protects the bushing it also adds to the life of the cable as will be readily understood. The surface about the opening through the center of the bushing is convex in section with the result that contact between the cable and the bushing is over a limited surface area and resulting friction is low.

Modifications of the invention may be resorted to without departing from the spirit thereof or the scope of the appended claim.

I claim:

A bushing having an annular body portion composed of an elastic material, a central opening through said bushing adapted to permit a cable to move therein, and a circumferentially extending peripheral groove, said body portion being substantially convex in center to periphery cross section, said opening being lined with lubricating means in the form of impregnated fabric attached to said body portion adjacent said opening, said groove having substantial depth and being wider at its bottom than at its mouth, one side of said groove being extended as a protruding lip adapted to facilitate the installation of said bushing in a hole in a partition wall.

ROY W. BROWN.